(12) United States Patent
Ogata

(10) Patent No.: US 10,335,959 B2
(45) Date of Patent: Jul. 2, 2019

(54) JOINT DRIVING APPARATUS AND ROBOT APPARATUS

(71) Applicant: CANON KABUSHIKI KAISHA, Tokyo (JP)

(72) Inventor: Masaru Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 15/067,686

(22) Filed: Mar. 11, 2016

(65) Prior Publication Data

US 2016/0263749 A1    Sep. 15, 2016

(30) Foreign Application Priority Data

Mar. 13, 2015    (JP) .................................. 2015-050123

(51) Int. Cl.
| | |
|---|---|
| *B25J 13/08* | (2006.01) |
| *B25J 17/00* | (2006.01) |
| *B25J 9/12* | (2006.01) |
| *B25J 17/02* | (2006.01) |

(52) U.S. Cl.
CPC .............. *B25J 17/00* (2013.01); *B25J 9/126* (2013.01); *B25J 13/085* (2013.01); *B25J 17/0208* (2013.01)

(58) Field of Classification Search
None
See application file for complete search history.

(56) References Cited

U.S. PATENT DOCUMENTS

| | | | |
|---|---|---|---|
| 5,155,423 | A | 10/1992 | Karlen et al. |
| 2011/0239788 | A1 | 10/2011 | Nagasaka et al. |
| 2012/0048628 | A1 | 3/2012 | Kawanami et al. |
| 2013/0211739 | A1 | 8/2013 | Nitz et al. |

FOREIGN PATENT DOCUMENTS

| | | |
|---|---|---|
| CN | 101539464 A | 9/2009 |
| CN | 102235926 A | 11/2011 |
| CN | 102494819 A | 6/2012 |
| CN | 103711741 A | 4/2014 |

(Continued)

OTHER PUBLICATIONS

Albu-Schäffer, et al., "The DLR Lightweight Robot: Design and Control Concepts for Robots in Human Environments," Industrial Robot: An International Journal, 2007, pp. 1, 376-385, vol. 34, No. 5, Emerald Publishing Limited.

(Continued)

*Primary Examiner* — William Kelleher
*Assistant Examiner* — Gregory T Prather
(74) *Attorney, Agent, or Firm* — Venable LLP

(57) ABSTRACT

The present invention allows a joint driving apparatus of a robot apparatus to measure joint driving torque with high accuracy and perform joint torque control accurately and reliably using a simple, inexpensive, small, lightweight and sturdy configuration without being affected by cross-axis disturbance forces. A joint driving apparatus includes a housing unit fixed to a first link; a bearing mounted in the housing unit and adapted to rotatably support a second link; a driving unit housed in the housing unit and adapted to rotationally drive the second link; a supporting unit installed between the driving unit and the housing unit and adapted to support the driving unit on the housing unit; and a sensor adapted to detect torque generated on the supporting unit.

12 Claims, 7 Drawing Sheets

(56) References Cited

FOREIGN PATENT DOCUMENTS

| EP | 2628575 A2 | 8/2013 |
|---|---|---|
| JP | S61-050030 A | 3/1986 |
| JP | H09-184777 A | 7/1997 |
| JP | 2006000955 A | 1/2006 |
| JP | 4273335 B2 | 6/2009 |
| JP | 2012-047460 A | 3/2012 |
| KR | 101194313 B1 | 10/2012 |

OTHER PUBLICATIONS

Kim, Bong-Seok et al.,"Developement of a Joint Torque Sensor Fully Integrated with an Actuator", ICCAS2005, June, pp. 1679-1683.

Search Report dated Dec. 20, 2016, in European Patent Application No. 16159566.5.

Chinese Office Action issued in corresponding Chinese Application No. 201610128482.8 dated Jun. 25, 2018.

Japanese Office Action issued in corresponding Japanese Application No. 2015-050123 dated Feb. 21, 2019.

Japanese Office Action issued in corresponding Japanese Application No. 2015-050123 dated Feb. 12, 2019.

JOINT DRIVING APPARATUS AND ROBOT APPARATUS

BACKGROUND OF THE INVENTION

Field of the Invention

The present invention relates to a joint driving apparatus provided with a second link pivotally supported on a first link and adapted to control relative orientation of the first and second links as well as to a robot apparatus equipped with the joint driving apparatus.

Description of the Related Art

In recent years, articulated robot manipulators have been finding increasingly wider uses and expanding their application to areas, such as collaborative work with humans and assembly work in a factory, in which robots are required to perform flexible movements. A stable and wide-band force control function is required of such a robot apparatus to follow external forces. Thus, there is demand to construct a control system based on joint-level torque control (torque servo) instead of a widely used conventional motion control system based on joint position control (position servo). The torque control requires a torque detection unit capable of accurately detecting torque which is output from joints of a robot arm.

As this type of robot apparatus, for example, a multi-joint robot is known which is made up of plural links coupled by plural joint drive shafts. Such a multi-joint robot arm is configured such that forces acting on a member on an end side accumulate and act on a base member (base or mount). In order to improve responsiveness and mobility of the robot, it is necessary to make the entire robot compact and lightweight. For that, it is necessary to reduce the size and weight of a drive mechanism.

Conventionally, regarding this type of joint driving apparatus, a configuration is known in which a torque detection apparatus adapted to measure output torque of the joint via a bearing adapted to rotatably support an output link is installed between an output shaft (final stage) of the joint driving apparatus, including a motor and a reduction mechanism, and a drive shaft of an output link. Generally, this type of torque detection apparatus is made up of a strain gage or an elastic member adapted to deform according to applied torque and a sensor device adapted to detect a deformation amount or distortion amount of the elastic member, for example, optically or magnetically.

For example, a robot arm equipped with a torque sensor is disclosed in "A. Albu-Schaeffer, S. Haddadin, Ch. Ott, A. Stemmer, T. Wimboeck, G. Hirzinger, "The DLR lightweight robot: design and control concepts for robots in human environments", Industrial Robot: An International Journal, Vol. 34, Iss: 5, pp. 376-385 (2007)" (hereinafter, referred to as an article by A. Albu-Schaeffer et al.). The robot arm disclosed in the article by A. Albu-Schaeffer et al. includes an inner ring coupled to a shaft driven by a servomotor via strain wave gearing, an outer ring coupled to a first member of the robot arm, and a torque sensor adapted to measure torque, i.e., rotational torque between the inner ring and outer ring. With the robot arm disclosed in the article by A. Albu-Schaeffer et al., relative displacement produced between the inner ring and outer ring when torque acts around a rotating shaft of a first member is detected as distortion of the elastic member of the torque sensor, thereby measuring the rotational torque acting on the first member.

However, in the configuration described in the article by A. Albu-Schaeffer et al., the torque sensor rotates together with a measuring object, causing, for example, a sensor cable attached to the torque sensor to deform along with motion of the drive shaft. Consequently, there is a problem in that when a reaction force from the sensor cable cannot be ignored, such as when a robot joint has a large operation angle, it is difficult to detect torque accurately. Also, with the configuration in the article by A. Albu-Schaeffer et al., a cable routing mechanism tends to become complicated, and it is not easy to ensure durability of the sensor cable.

Also, as a torque detection apparatus for a drive system of a sphere tire adapted to move a robot apparatus, a configuration is proposed, for example, in Japanese Patent Application Laid-Open No. 2012-047460. The configuration disclosed in Japanese Patent Application Laid-Open No. 2012-047460 includes a driving unit made up of a rotor and a stator, where the rotor has a spindle in a first axial direction and the stator causes the rotor to rotate around the spindle. The torque detection apparatus includes a strain body and a detection element, where the strain body is placed concentrically with the rotor and provided with a first end portion fixed to a base portion and a second end portion fixed to the stator while the detection element is attached to the strain body and adapted to detect distortion of the strain body around a first axis.

However, in the configuration described in Japanese Patent Application Laid-Open No. 2012-047460, the strain body (elastic member) of the torque detection apparatus is placed between the base portion and a support mechanism (bearing) for the driving mechanism. With this configuration, a force acting on a driving torque output link acts directly on the strain body, posing a problem in that a torque sensor is susceptible to cross-axis components when the configuration is applied to a joint mechanism of the robot apparatus. Consequently, sensor output values may fluctuate under the influence of disturbance forces other than the desired torque around the drive shaft, which could result in a failure to detect output torque accurately (hereinafter, this problem will be referred to as interfering with the other axis or crosstalk).

Japanese Patent Application Laid-Open No. 2012-047460 presents a configuration in which the driving mechanism is pivotally supported by the support mechanism made up of the bearing and a frame body to reduce the influence of cross-axis forces acting on the elastic member of the torque sensor such as described above. However, this configuration will increase in complexity and size because of the support mechanism which supports the driving mechanism. In particular, when one attempts to apply the configuration of Japanese Patent Application Laid-Open No. 2012-047460 to a joint of the robot apparatus, rigidity and strength equal to or higher than those of links joined via the joint have to be secured for the bearing of the support mechanism for the driving mechanism in order to maintain rigidity and strength of the entire joint. Thus, as a joint driving apparatus of the robot apparatus, a joint area may become too large in mass and size.

SUMMARY OF THE INVENTION

In view of the above problem, an object of the present invention is to allow a joint driving apparatus of a robot apparatus to measure joint driving torque with high accuracy and perform joint torque control accurately and reliably using a simple, inexpensive, small, lightweight and sturdy configuration without being affected by cross-axis disturbance forces.

According to an aspect of the present invention, a joint driving apparatus comprises: a housing unit fixed to a first link; a bearing mounted in the housing unit and adapted to rotatably support a second link; a driving unit housed in the housing unit and adapted to rotationally drive the second link; a supporting unit installed between the driving unit and the housing unit and adapted to support the driving unit on the housing unit; and a sensor adapted to detect torque generated on the supporting unit.

According to the present invention, the torque sensor is installed between the driving unit and the housing unit to detect torque produced on the supporting unit adapted to support the driving unit on the housing unit. The torque sensor can be fixed to the first link (fixed link), eliminating the need to route sensor cables for supplying power to the torque sensor and exchanging signals. This makes the configuration of the entire driving mechanism simple and compact, allowing the entire robot apparatus to be reduced in weight. Also, deformation of the sensor cable due to rotational motion of the joint driving apparatus can be inhibited, which enables preventing deterioration of the sensor cable as well as reduction of torque detection accuracy caused by deformation resistance of the sensor cable.

Also, the present invention is configured to support components of the forces acting on the second link (output link) excluding the rotational torque of a desired measurement object, using the bearing and housing unit. Therefore, cross-axis force (disturbance force) components other than the rotational torque to be detected do not act on the torque sensor adapted to detect the torque occurring on the supporting unit. This eliminates the need to install an additional support mechanism to support the torque sensor and driving unit, enables configuring the entire joint driving apparatus to be simple and compact, and thus makes it easy to reduce the size and weight of the entire joint driving apparatus and ensure rigidity of the joint driving apparatus. Thus, the present invention can reduce the size and weight of the entire robot apparatus which uses the joint driving apparatus and improve the responsiveness and agility of the robot apparatus.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings. Note that the embodiments described below are strictly exemplary and that those skilled in the art may change, for example, configuration details, as appropriate, without departing from the spirit and scope of the present invention. Also, the numeric values cited in the embodiments of the present invention are guidelines, and are not intended to limit the present invention.

First Embodiment

Figure 1:
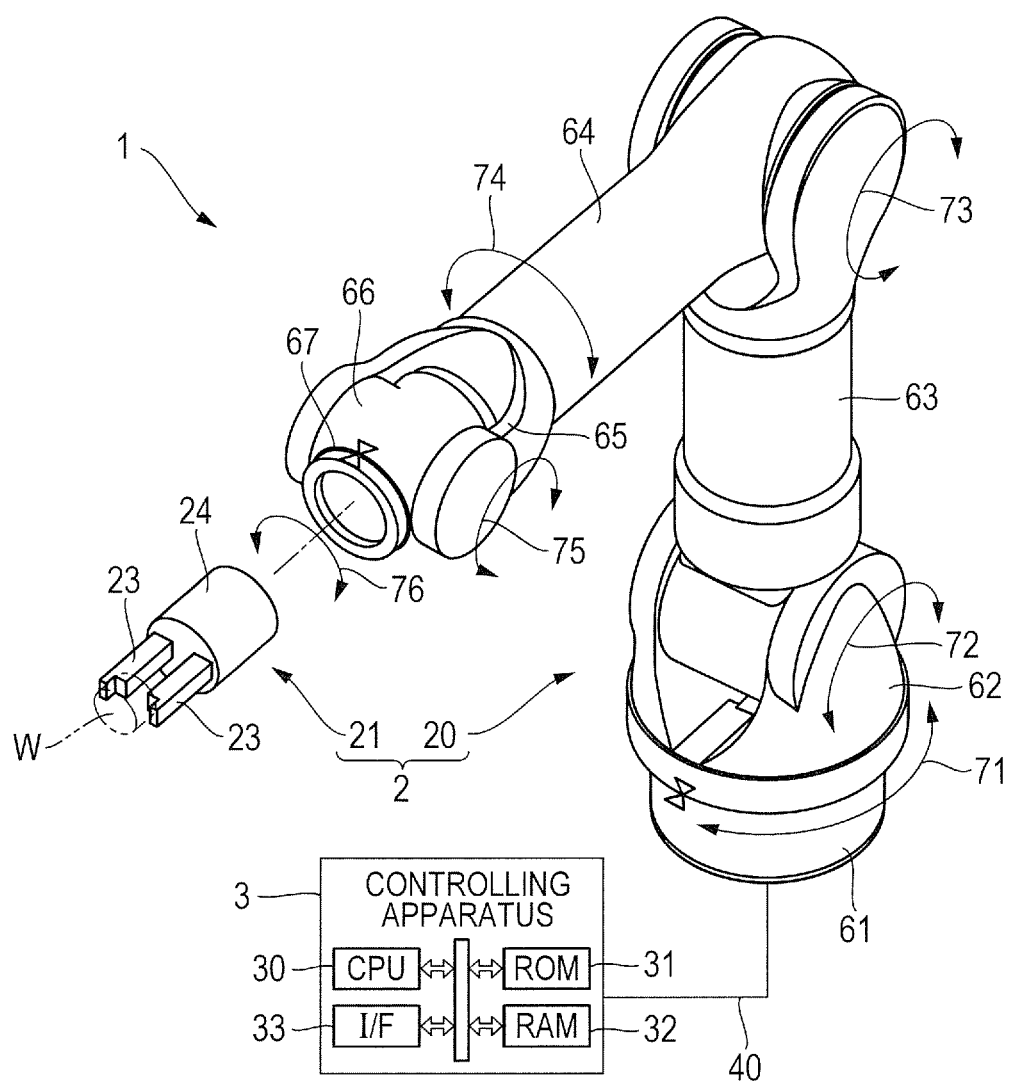
FIG. 1 is an explanatory diagram showing a schematic configuration of a robot apparatus capable of implementing the present invention.

As shown in FIG. 1, a robot apparatus 1 includes a robot body 2 and a controlling apparatus 3 adapted to control the robot body 2. The robot body 2 is equipped with a hand 21 as an end effector in a front end portion of, for example, a six-axis vertical multi-joint robot arm (hereinafter, referred to as an arm) 20. The arm 20 includes seven links 61 to 67 and six joint driving apparatus 71 to 76 adapted to swingably or pivotably couple together the links 61 to 67.

The hand 21 is supported by being attached to a foremost link 67 of the arm 20 and is configured such that motion (changes in position and orientation) or a force of the hand 21 will be adjusted by movement of the arm 20. The hand 21 includes a hand body 24 and plural fingers 23 disposed movably with respect to the hand body 24 and configured to be able to grip a workpiece W.

The controlling apparatus 3 includes a CPU 30 made up of a general purpose microprocessor and the like. The CPU 30 controls movement of the robot body 2 by executing a robot control program stored, for example, in a ROM 31. In so doing, a RAM 32 is used as a work area for program execution. Note that a program storage area of the ROM 31 may be made up of a rewritable storage medium such as an EEPROM. In that case, the robot control program can be installed in the ROM 31 or updated by supplying programs and control data from a flash memory or optical disk (not shown).

Also, the controlling apparatus 3 includes an interface 33. The interface 33 is used to transmit control information to the robot body 2 and input detection information from the side of the robot body 2, where the control information is used to control the movement of the joint driving apparatus 71 to 76 or hand 21 while the detection information is provided by a torque sensor (52s) described later. Also, the interface 33 may include a network interface and the like. In that case, the robot control program can be installed in the ROM 31 or updated using programs and control data received from a network. The network interface described above can also be used for communications with a robot teaching terminal (teaching pendant) and an off-line control terminal for use to create and edit the robot control program (neither terminal is shown).

Figure 2:
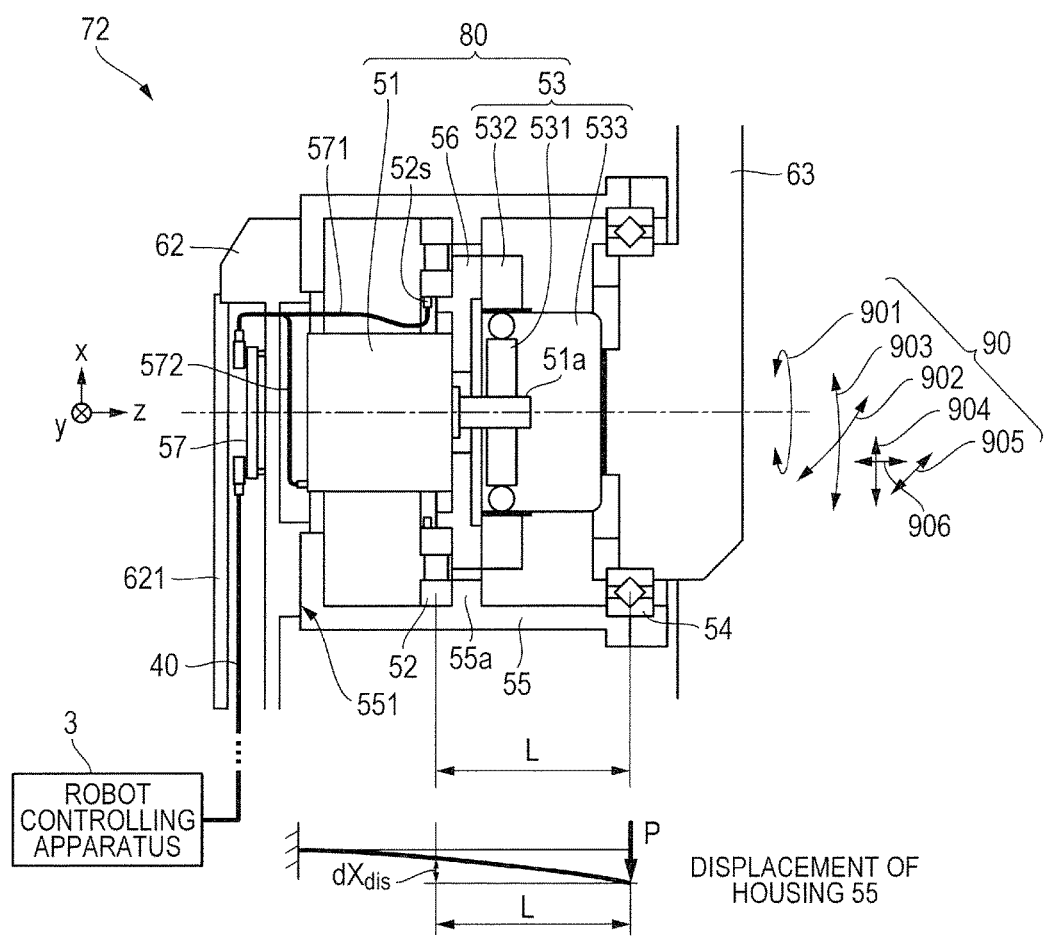
FIG. 2 is an explanatory diagram showing a structure of a joint driving apparatus according to a first embodiment of the present invention.

FIG. 2 shows a sectional structure of the joint driving apparatus 72 of the arm 20 as an example of the joint driving apparatus 71 to 76. The configuration shown in FIG. 2 is also applicable to the other joint driving apparatus 71 to 76 of the arm 20. After-mentioned components of the joint driving apparatus 72 are made of material such as metal, resin or the like which conform to the strength and rigidity required by specifications.

In FIG. 2, the joint driving apparatus 72 includes a link 62 (first link) as a base-side member (fixed link) of the driving mechanism and a link 63 (second link) as an output side member (output link) of the driving mechanism. The link 62 (fixed link) and link 63 (output link) are configured to be rotatably coupled by a bearing 54, which is a joint support mechanism supported on the housing unit 55.

The bearing 54 constrains rotational motion of the link 63 relative to the link 62 to allow only rotational motion around the drive shaft. The bearing 54 has a function to support five forces/moments (FIG. 2), excluding rotational torque around the joint drive shaft, out of six-dimensional (translational) forces and moments acting on the link 63. For example, a cross-roller bearing, which is widely used for robot joint mechanisms, can be used for the bearing 54, but this is not restrictive and other bearing members having similar functions are available for use.

In FIG. 2, a force acting on the link 63 is indicated by reference numeral 90. The force (90) acting on the link 63 can be regarded as the composition of the following components:

(1) Rotational torque (around z axis) 901 to be measured of the given joint;
(2) Rotational moment component (x direction) 902 of cross-axis forces acting on the link 63;
(3) Rotational moment component (y direction) 903 of cross-axis forces acting on the link 63;
(4) Translational force component (x direction) 904 of cross-axis forces acting on the link 63;
(5) Translational force component (y direction) 905 of cross-axis forces acting on the link 63; and
(6) Translational force component (z direction) 906 of cross-axis forces acting on the link 63.

When a rotary drive source 51 (described below) operates, the rotational torque (around z-axis) 901 is produced, controlling an orientation (angle) of the link 63 relative to the link 62. In so doing, the bearing 54 serving as a joint support mechanism restrains rotational motion of the joint around a joint axis (alternate long and short dash line) while supporting the cross-axis forces 902 to 906 described above.

The joint driving apparatus 72 includes a housing unit 55 configured to be approximately cylindrical in shape as a whole and adapted to house a driving unit 80 made up of the rotary drive source 51 and a reduction mechanism 53. The housing unit 55 stores members needed to drive the joint as well as components needed to measure output torque.

According to the present embodiment, when a certain component is rigidly fixed to another component, the joining (fixing) region is referred to as a "fixing portion". For joining (fixing) in the "fixing portion", a technique such as screwing (details are not shown) is used. For example, a fixing portion 551 is part of the housing unit 55, which is fixed to the base-side link 62 of the joint driving apparatus 72 via the fixing portion 551.

The housing unit 55 according to the present embodiment includes the bearing 54 adapted to rotatably support the (second) link 63. Also, the housing unit 55 houses the driving unit 80 adapted to rotationally drive the (second) link 63. In particular, the driving unit 80 is supported in the housing unit 55 such that pivot (drive) shafts will coincide each other as follows. First, a drive shaft 51a of the rotary drive source 51 of the driving unit 80 is joined to an input end 531 of the reduction mechanism 53. Also, the reduction mechanism 53 is made up of a strain wave gearing mechanism and the like, the input end 531 and an output end 533 are placed coaxially, and a pivot shaft of the link 63 is joined to the output end 533.

A supporting unit (532, 56, 52) adapted to support the driving unit 80 on the housing unit 55 are provided between the driving unit 80 and housing unit 55. The supporting unit includes a fixing portion 532 of the reduction mechanism 53, a holding member 56 of the rotary drive source 51, and the torque detection apparatus 52. The holding member 56 and fixing portion 532 are members generally annular in shape (flange-shaped) and it is assumed that recesses (open holes) approximately cylindrical in shape are formed in their front and back surfaces, as required, to accept a front end or rear end of the rotary drive source 51 or reduction mechanism 53.

The rotary drive source 51 is firmly fixed to the holding member 56, for example, by screwing (not shown) or the like, and the holding member 56 is firmly fixed to the fixing portion 532 of the reduction mechanism 53, for example, by screwing (not shown) or the like. Consequently, the rotary drive source 51 and reduction mechanism 53 are integrally joined (firmly fixed) together, making up the driving unit 80.

Then, the driving unit 80 is joined (firmly fixed) to the housing unit 55 via the torque detection apparatus 52. Also, the second link 63, which is an output link, can pivot about the bearing 54 mounted in the housing unit 55, and the drive shaft of the link 63 is joined to the output end 533 of the reduction mechanism 53.

Thus, the driving unit 80 is housed and supported in the housing unit 55 by the supporting unit (the fixing portion 532 of the reduction mechanism 53, holding member of the rotary drive source 51 and torque detection apparatus 52) and the bearing 54 mounted in the housing unit 55. That is, the driving unit 80 is housed and supported at a center position of the housing unit 55 by the supporting unit (the fixing portion 532 of the reduction mechanism 53, holding member 56 of the rotary drive source 51 and torque detection apparatus 52) and the bearing 54 in such a way that a center line of the cylindrical housing unit 55 will match a drive axis.

Detailed configuration and arrangement of components housed in the housing unit 55 as well as operating principles of driving of joints and measurement of torque will be described below.

The rotary drive source 51, which generates a turning force (torque) to rotate a joint, is made up, for example, of an electric motor (servomotor). The rotary drive source 51 includes a rotary encoder for use to measure a motor rotation angle and a brake for use to hold the motor rotation angle (neither is shown). Also, the rotary drive source 51 is connected with a motor wiring cable 572 to electrically drive the motor, input and output signals from/to the rotary encoder, and control on/off operation of the brake.

The reduction mechanism 53 is made up of the input end 531, the output end 533, and the fixing portion 532 of the reduction mechanism 53. A transmission mechanism of the reduction mechanism 53 is made up of, for example, a known strain wave gearing mechanism. According to the present embodiment, it is assumed that a reduction ratio of the reduction mechanism 53 is, for example, about 1:100.

The output of the rotary drive source 51 rotationally drives the input end 531 of the reduction mechanism 53, and the reduction mechanism 53 increases the torque generated by the rotary drive source (and simultaneously reduces the rotation angle at the reduction ratio) according to the reduction ratio and outputs the increased rotational torque through the output end 533. Consequently, the torque generated by the rotary drive source 51 is increased to a level suitable to drive the joint, and the link 63 constrained by the bearing 54 is actively driven by remaining rotational degrees of freedom (rotational freedom around the drive shaft) of the output torque of the reduction mechanism 53.

Here, the torque which can efficiently be produced by a small electric motor is usually far smaller than the torque needed to drive a joint. On the other hand, a rated rotational speed is much larger than the rotational speed required of the output shaft of the joint. Consequently, a reduction mechanism (53) with a high reduction ratio of about 1:30 to 1:200 is commonly used by most robots. A combination of such a small motor and a reduction mechanism (53) with a high reduction ratio has the advantage of making the configuration compact, but has a problem in that the reduction mechanism (53) causes a large torque loss due to friction and rotational resistance.

Consequently, rotational torque which is output to an output stage of the joint cannot be accurately determined by simply measuring motor torque, for example, by measuring a motor current proportional to the motor torque. Also, torque loss around a drive system including the reduction mechanism is caused mainly by non-linear physical phenomena such as friction, making precise modeling difficult and resulting in poor reproducibility. This makes the process of correcting the motor torque value detected via a motor current and thereby calculating actual output torque extremely difficult. Thus, if joints have to be controlled based on accurate torque detection, it is necessary to measure the output torque of the joint driving apparatus by installing a torque detection apparatus.

As described above, the present embodiment adopts a configuration in which the driving unit 80 is housed and supported in the housing unit 55 by the supporting unit (the fixing portion 532 of the reduction mechanism 53, holding member 56 of the rotary drive source 51 and torque detection apparatus 52) and the bearing 54 mounted in the housing unit 55. Then, the present embodiment detects the torque generated on the supporting unit using the torque detection apparatus 52 placed on the supporting unit.

As described above, the driving unit 80 of the joint driving apparatus 72 is made up of the rotary drive source 51 and reduction mechanism 53. Then, as shown in FIG. 2, the fixing portion 532 of the reduction mechanism 53 is joined to the torque detection apparatus 52 via the holding member 56. Furthermore, the torque detection apparatus 52, is joined (firmly fixed), for example, by screwing (details are not shown), to a flange portion 55a provided inside the housing unit 55.

According to the present embodiment, the supporting unit (the fixing portion 532 of the reduction mechanism 53, holding member 56 of the rotary drive source 51 and torque detection apparatus 52) of the driving unit 80 unites the driving unit 80 and supports the driving unit 80 in the housing unit 55 in conjunction with the bearing 54.

Figure 5:
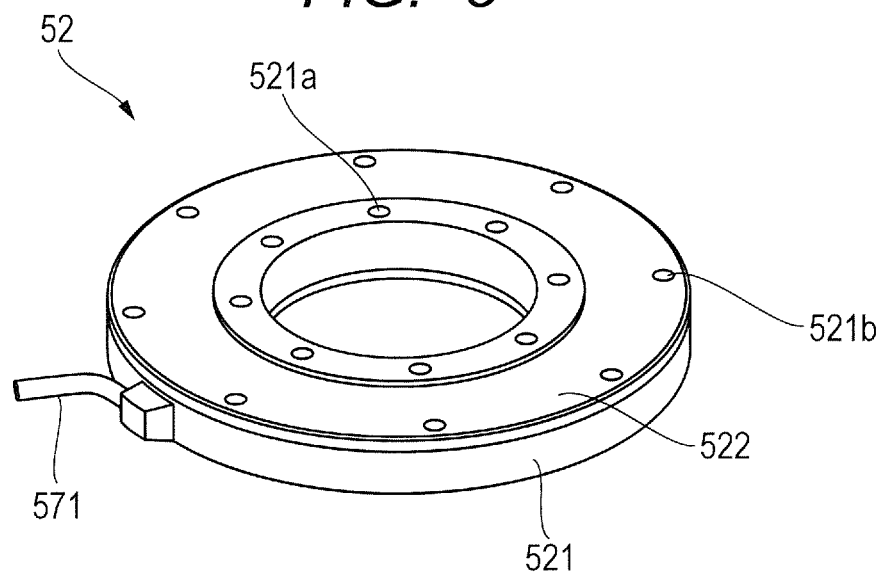
FIG. 5 is a perspective view showing an exemplary external shape of a torque sensor according to the first embodiment of the present invention.

A configuration example of the torque detection apparatus 52 is shown in FIG. 5. The torque detection apparatus 52 of FIG. 5 is made up of an exterior member (cover) 522 and an elastic body 521. As illustrated, the exterior member 522 and elastic body 521 are generally annular in shape (ring-shaped) and provided with screw holes 521a and 521b for connection with the holding member 56 of the driving unit 80 and flange portion 55a of the housing unit 55.

Also, the torque detection apparatus 52 includes a sensor cable 571 for deriving output from a torque sensor 52s (FIG. 2). The sensor cable 571 is connected with a joint controller 57 placed inside a case 621 of the first link 62 (fixed link) as shown in FIG. 2. Also, the joint controller 57 is connected with the rotary drive source 51 via the motor wiring cable 572. The joint controller 57 is connected to the controlling apparatus 3 via a cable 40, and the torque detection apparatus 52 transmits the output of the torque sensor 52s to (the interface 33 of) the controlling apparatus 3 and receives a drive signal used by the controlling apparatus 3 to control the driving unit 80.

Now, consider operating the driving unit 80 such that relative orientations of the links 62 and 63 of the joint driving apparatus (72) will be at a predetermined angle or that the links 62 and 63 will be kept in particular relative orientations. In so doing, as can be seen from a location (FIG. 2) of the torque detection apparatus 52, upon receiving a reaction force of the driving torque from the driving unit 80, the elastic body 521 of the torque detection apparatus 52 deforms according to magnitude of the reaction force. By detecting the deformation of the elastic body 521 using the torque sensor 52s (FIG. 2), the torque generated on the supporting unit (the fixing portion 532 of the reduction mechanism 53, holding member 56 of the rotary drive source 51 and torque detection apparatus 52) of the driving unit 80 can be detected. The torque sensor 52s can be an optical sensor, magnetic sensor, or any other sensor device using any detection method. The torque value can be treated as driving torque (actual) for the joint driving apparatus (72) generated by the driving unit 80.

Figure 6:
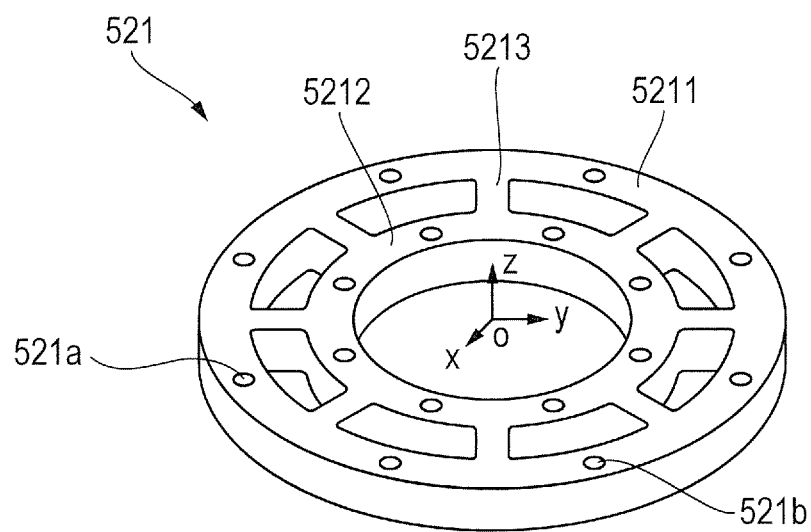
FIG. 6 is a perspective view showing an exemplary shape of an elastic body making up the torque sensor of FIG. 5.

The elastic body 521 of the torque detection apparatus 52 in FIG. 5 can have a configuration such as shown in FIG. 6. The elastic body 521 of FIG. 6 includes an inner ring portion 5212, an outer ring portion 5211, and a spokelike elastically deformable portion 5213 configured to join together the inner ring portion 5212 and outer ring portion 5211. The inner ring portion 5212 and outer ring portion 5211 are provided with screw holes 521a and 521b for connection with (the holding member 56) of the driving unit 80 and flange portion 55a of the housing unit 55, respectively. That is, the elastic body 521 is fixed to the driving unit 80 on its inner circumference side, and fixed to an inner surface of the housing unit 55 on its outer circumference side.

The torque sensor 52s (FIG. 2) is attached, for example, so as to detect a deformation amount of elastically deformable portion 5213. This enables measuring the torque (rotational moment around z axis in FIG. 2) generated on the supporting unit (the fixing portion 532 of the reduction mechanism 53, holding member of the rotary drive source 51 and torque detection apparatus 52) of the driving unit 80 via the torque sensor 52s (FIG. 2).

Upon receiving reaction of the torque (antitorque) which is output by the driving unit 80 of the joint driving apparatus 72, the torque detection apparatus 52 configured as shown in FIGS. 5 and 6 can detect the driving torque of the driving unit 80 via the antitorque.

That is, with the configuration of the present embodiment, a torque detection unit is not mounted on the side of the second link 63 (output link) configured to rotate relative to the first link 62 (fixed link). According to the present embodiment, even though the torque detection apparatus 52 is placed on the side of the first link 62 (between the housing unit 55 and driving unit 80), the torque which is output by the joint driving apparatus (72) can be measured.

With the configuration of the present embodiment, the sensor cable 571 (FIG. 2) does not need to be laid across moving part of the joint driving apparatus (72). This eliminates the need to route the sensor cable 571, consequently, making the configuration of the entire driving mechanism simple and compact, and thus can reduce the weight of the entire robot apparatus. Also, there is no need to take into consideration the deformation of the sensor cable 571 resulting from the rotational motion of the joint driving apparatus (72), which enables preventing, for example, reduction of torque detection accuracy caused by deformation resistance of the sensor cable 571. Also, reduction of cable life caused by repeated deformation of the sensor cable 571 and sliding between the cable and cable supporting unit can be prevented and reliability of the robot apparatus can be improved greatly.

Figure 10:
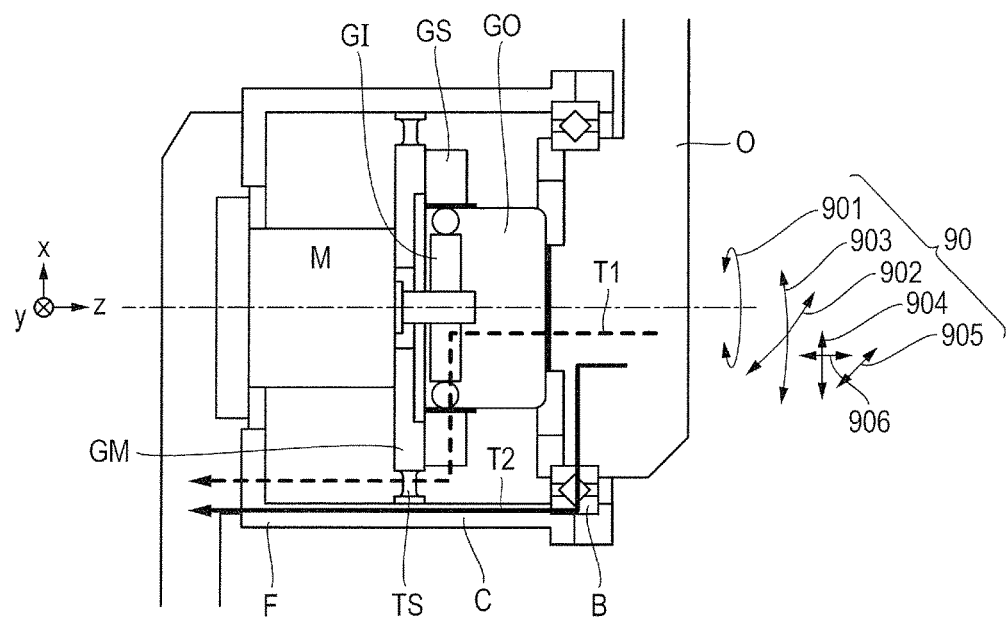
FIG. 10 is an explanatory diagram showing a transmission path of a force acting on an output link to a fixed link in the joint driving apparatus according to the present invention.

Also, according to the present embodiment, the driving torque of the driving unit 80 of the joint driving apparatus (72) can be detected without being affected by disturbance caused by cross-axis forces. Here, FIG. 10 shows a transmission path of a force and moment acting on the link 63 (output link) of the joint driving apparatus (72) according to the present embodiment. FIG. 10 schematically shows a configuration equivalent to that of a joint driving apparatus (72) corresponding to FIG. 2. In FIG. 10, forces acting on various components and members corresponding to those in FIG. 2 are indicated by uppercase alphabetic characters while correspondence to reference numerals used above are shown in parentheses.

Figure 11:
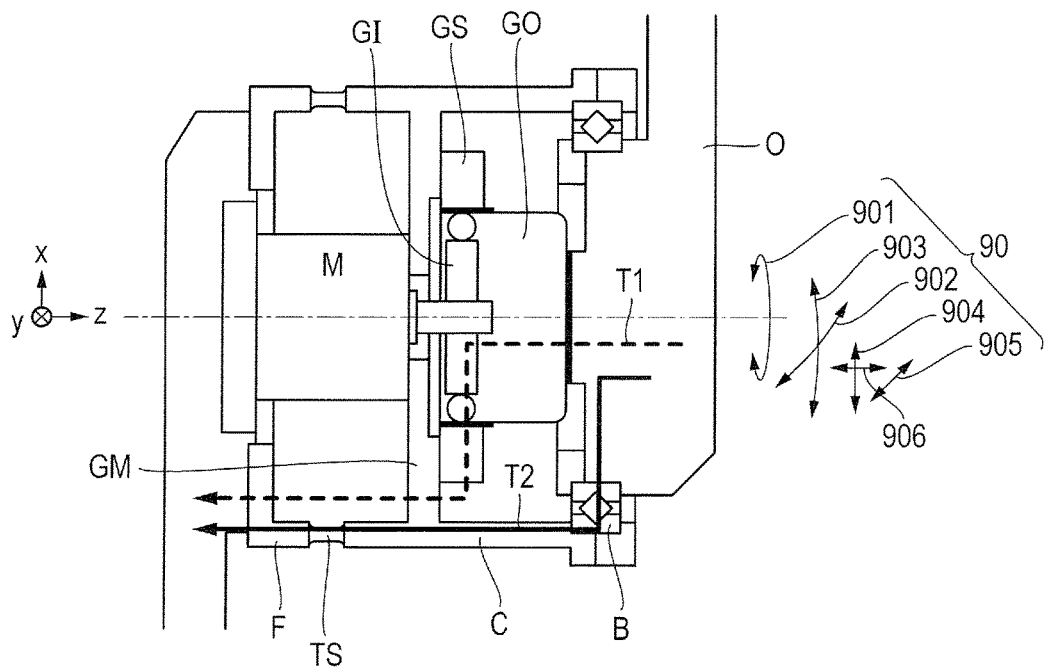
FIG. 11 is an explanatory diagram showing a transmission path of a force acting on an output link to a fixed link in a conventional joint driving apparatus.
Figure 12:
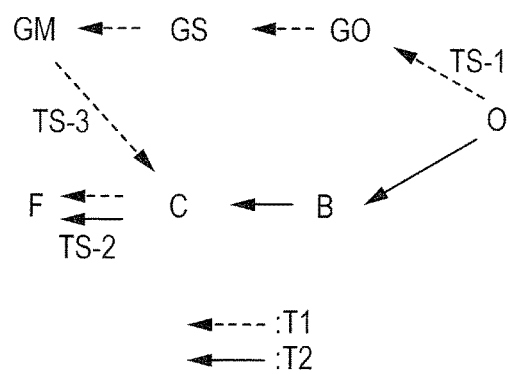
FIG. 12 is an explanatory diagram schematically showing a transmission path of a force in the configurations of FIGS. 10 and 11.

Also, FIG. 12 shows transmission paths of forces among the members in FIG. 10 by extracting and indicating the transmission paths with arrows. A path T1 indicated by a broken line and a path T2 indicated by a solid line in FIG. 12 are equivalent to paths T1 and T2 in FIG. 11, respectively.

In FIGS. 10 and 12, reference character O denotes output of the output link (link 63), B denotes output of a joint support mechanism (the bearing 54), and GO denotes output of the driving unit (80: rotary drive source 51 and reduction mechanism 53). Also, GS denotes the fixing portion (532) of the driving unit (80), and GI denotes the input end (531) of the driving unit (80). Also, M denotes the rotary drive source (51), C denotes the housing unit (55), GM denotes a fixed member, F denotes a fixing portion to be joined to a fixed link (the link 62) of the housing, and TS denotes the torque detection apparatus (52).

In FIGS. 10 and 12, when the robot apparatus performs motion, six-dimensional (translational) forces and moments (902 to 906) act on the output link (link 63) as described above in FIG. 2. In the present embodiment, what one wants to measure with a torque detection apparatus is the rotational torque 901 around the joint drive shaft. Cross-axis forces (902 to 906) are disturbance forces which will cause crosstalk for the torque detection apparatus.

As described above, the disturbance forces (five forces/moments (902 to 906) other than the rotational torque around the joint drive shaft) are supported by the bearing 54 (joint support mechanism). Thus, as shown in FIG. 10, cross-axis disturbance forces acting on output are supported by the housing unit via the bearing and transmitted to the fixed link (link 62) on the base side (path T2 in FIG. 10).

The force acting on the torque detection apparatus TS (52) via the driving unit 80 (rotary drive source 51 and reduction mechanism 53) passes through the path T1 in FIG. 10, and contains only the torque around the joint drive shaft without containing the disturbance forces. In FIG. 12, in particular, the joint driving torque (TS-1) according to the present embodiment is transmitted as indicated by a broken line, passes through a path TS-3 (which corresponds to the torque detection apparatus TS of FIG. 10), and is transmitted to the housing unit (C). The path (T1: broken line) is separated from the path (T2: solid line) of cross-axis disturbance forces, and the torque detection apparatus TS (FIG. 10; 52) is not affected by the cross-axis disturbance forces.

Now, in comparison with the present embodiment, transmissions of forces on a conventional joint driving apparatus are shown in FIG. 11. In FIG. 11, components and forces are denoted by the same alphabetic symbols as the corresponding components and forces in FIG. 10.

In the joint driving apparatus of FIG. 11, the torque detection apparatus TS is placed between the fixed link (F) and housings (C). Therefore, the joint driving apparatus of FIG. 11 is configured such that cross-axis forces (path T2) act directly on the torque detection apparatus TS together with the torque (path T1) around the joint drive shaft to be detected. Consequently, in the configuration of FIG. 11, the cross-axis forces cause increased crosstalk, making accurate torque detection difficult.

For example, in FIG. 12, a path TS-2, which corresponds to the torque detection apparatus TS of FIG. 11, is shared by the torque (broken line) around the joint drive shaft and crosstalk (solid line) caused by cross-axis forces. That is, with the conventional configuration of FIG. 11, the torque detection apparatus TS cannot detect the torque (broken line) around the joint drive shaft to be detected, by separating the torque from the crosstalk (solid line) caused by cross-axis forces.

On the other hand, as shown in FIGS. 10 and 12, the joint driving apparatus according to the present embodiment, which is configured such that cross-axis disturbance forces will not act on the torque detection apparatus (TS; 52), can accurately detect joint driving torque without being affected by cross-axis interference and crosstalk. Furthermore, the configuration of the present embodiment does not need an additional support mechanism to support the torque sensor and driving unit compared to the conventional technique (e.g., Japanese Patent Application Laid-Open No. 2012-047460). This makes the configuration of the entire joint portion of the robot arm simple and compact, making it easy to reduce the weight of the entire driving mechanism and ensure the rigidity of the driving mechanism. This in turn allows the weight of the entire robot apparatus to be reduced, enabling improvement in the responsiveness and agility of the robot.

Now, the extend of cross-axis interference on the joint driving apparatus according to the present embodiment will be described by citing results obtained through calculations conducted based on concrete numeric values. Here, the deformation amount by which the elastic body 521 of the torque detection apparatus 52 is deformed by the output torque of the joint and the deformation amount by which the housing unit is deformed by cross-axis forces are calculated and compared with each other.

It is assumed that this calculation example is applicable to a small vertical multi-joint robot about 2 kg in transportable mass. Torsional rigidity K of the elastic body 521 of the torque detection apparatus 52 in a torque measurement direction (z-axis direction in FIG. 2) is about 20,000 Nm/rad (sufficiently high compared to the rigidity of the reduction mechanism). The torque detection apparatus 52 measures torque by measuring the deformation amount of the inner ring portion 5212 with respect to the outer ring portion 5211 of the elastic body 521 (FIG. 6) using the torque sensor (52s).

The torque sensor (52s) made up of a displacement measurement sensor, which can be an optical, magnetic, or any other sensor, is mounted, for example, within a circumference (or circular arc) with a radius of R=30 mm around the elastic body 521.

Here, a maximum value P of the translational force acting on the joint driving apparatus (72) of FIG. 2 is about 300 N in the x direction when pushing operation and acceleration and deceleration motions of the robot are taken into consideration. Likewise, the torque T acting on the joint is about 50 Nm. Also, in FIG. 2, outside diameter D of the housing unit is 90 mm, inside diameter d of the housing is 85 mm, and material is an aluminum alloy (modulus of longitudinal elasticity E=90 GPa). Also, a distance L from the bearing 54 supporting the joint to an installation location of the torque detection apparatus 52 is 30 mm.

At this time, the deformation amount $dX_T$ of the inner ring which is output by the torque sensor 52s when the joint is outputting rated torque is given by Expression (1) below.

$$dX_T = R \times T/K = 0.03 \text{ (m)} \times 50 \text{ (Nm)}/20{,}000 \text{ (Nm/rad)} = 75 \text{ (μm)} \quad (1)$$

Here, if the housing unit is modeled as a beam having a simple cylindrical section, the geometric moment of inertia of the beam is given by Expression (2) below.

$$I = \pi(D^4 - d^4)/32 = 1.6 \times 10^{-6} \text{ (m}^4\text{)} \quad (2)$$

Thus, a deformation amount $dX_{dis}$ of the displacement detecting unit of the torque sensor 52s caused by the maximum value P of cross-axis forces is given by Expression (3) below.

$$dX_{dis} = PL^3/3EI = 0.023 \text{ (μm)} \quad (3)$$

As described above, it can be seen that with the configuration of the present embodiment, there is no less than 3000-times difference between the deformation amount by which the elastic body of the sensor is deformed by torque measurement and the deformation amount by which the elastic body is deformed by cross-axis disturbance forces. That is, the present embodiment can detect the joint driving torque by being rarely affected by crosstalk caused by cross-axis forces and accurately detect the joint driving torque without being affected by the crosstalk caused by the cross-axis forces.

Note that the numeric values shown above are only exemplary in the present embodiment, and are not intended to limit the present invention in any way. Also, according to the present embodiment, a six-axis vertical multi-joint robot arm is used as the arm 20, but the number of axes can be changed as appropriate according to uses and purposes. For example, the configuration of the joint driving apparatus described above can also be applied easily to joints of a parallel-link robot arm. Also, although the links 61 to 67 of the arm 20 in FIG. 1 are fixed in length, for example, extendable links using linear actuators may be adopted as well.

Also, although in the present embodiment, a cross-roller bearing which can implement a desired support function by means of a single mechanism is used as the bearing 54 (joint support mechanism), concrete configuration of the support mechanism is not limited to this. For example, plural angular bearings may be used or a joint support function may be implemented by combining bearing mechanisms of other forms. Furthermore, although a ratio of 1:100 has been shown as a reduction ratio of the reduction mechanism 53, this is not restrictive and the reduction ratio of the reduction mechanism 53 may be set to any desired value.

Also, in the present embodiment, the driving unit (joint torque generating mechanism) 80 is configured by combining the rotary drive source 51 such as an electric motor and the reduction mechanism 53 such as a strain wave gearing mechanism. However, the form of the joint driving unit 80 is not limited to this, and, for example, a direct drive motor without a reduction mechanism may be used. Also, the energy source is not limited to an electrically operated driving mechanism, and a hydraulic or other fluid drive mechanism can implement a member arrangement similar to the one described above.

Second Embodiment

As shown in FIG. 2 and Expression (3), it can be seen that the deformation amount of the outer ring portion 5211 of the elastic body 521 of the torque detection apparatus 52 is affected greatly by the distance L between the installation location on the housing unit 55 and the bearing 54 supporting the joint. Thus, if the torque detection apparatus 52 (elastic body 521) can be placed close to the bearing 54, an amount of cross-axis interference can be reduced further.

Figure 3:
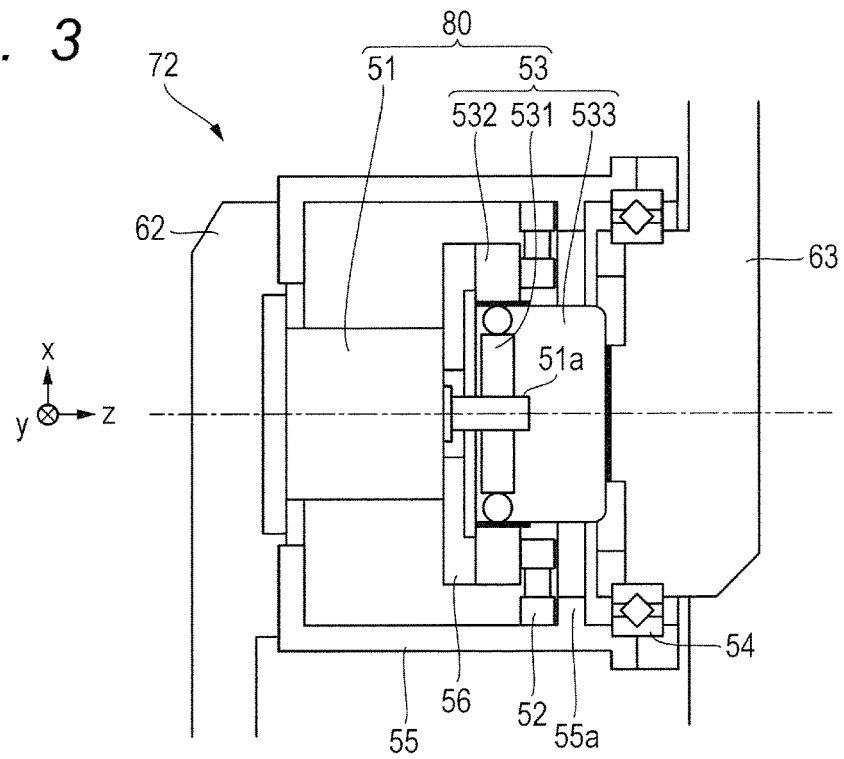
FIG. 3 is a schematic diagram showing a sectional structure of a joint driving apparatus according to a second embodiment of the present invention.

For example, as shown in FIG. 3, the flange portion 55b used to attach the torque detection apparatus (elastic body 521) to the housing unit 55 is placed closer to the bearing (joint support mechanism) 54 than the flange portion (55a) in FIG. 2. Then, the torque detection apparatus 52 (elastic body 521) is mounted between the fixing portion 532 of the reduction mechanism 53 and the flange portion 55b. The rest of the configuration is similar to FIG. 2.

In the configuration of FIG. 3, the torque detection apparatus 52 (elastic body 521) is placed between the fixing portion of the driving unit 80 (fixing portion 532 of the reduction mechanism 53) and the housing unit 55 as with the first embodiment. However, in FIG. 3, the torque detection apparatus 52 (elastic body 521) is attached to the housing unit 55 at a location between the bearing (joint support mechanism) 54 and driving unit 80, and more particularly, at a location closer to the bearing 54 supporting the second link 63.

In this way, by attaching the torque detection apparatus 52 to the housing unit 55 at a location closer to the bearing 54 and carrying out detection at a location closer to the bearing 54, the amount of cross-axis interference can be reduced further, enabling more accurate torque detection.

Third Embodiment

In the embodiments described above, the elastic body 521 of the torque detection apparatus 52 has been shown as having an annular shape (ring shape) by example. However, the joint driving apparatus (72) may be configured as shown in FIG. 4 using the torque detection apparatus 52 which employs an elastic body of different shapes such as shown in FIGS. 7 to 9.

Figure 7:
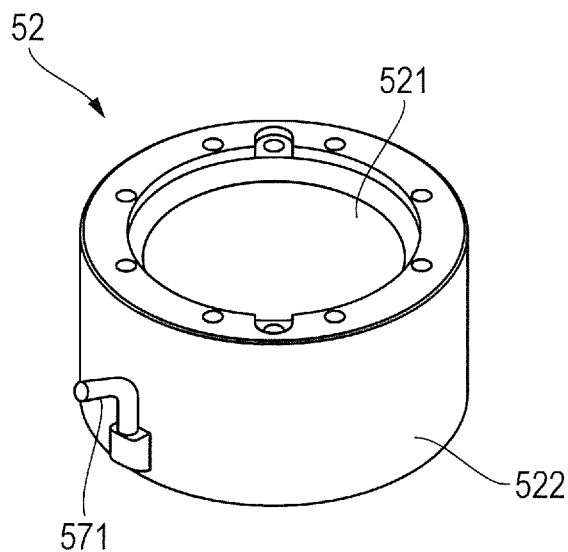
FIG. 7 is a perspective view showing an exemplary external shape of a torque sensor according to the third embodiment of the present invention.

The present embodiment uses a torque detection apparatus 52 such as shown in FIG. 7. The torque detection apparatus 52 includes an elastic body 521, an exterior member (cover) 522 configured to protect the elastic body 521, and a sensor cable 571 and has an approximately cylindrical shape as a whole.

Figure 8:
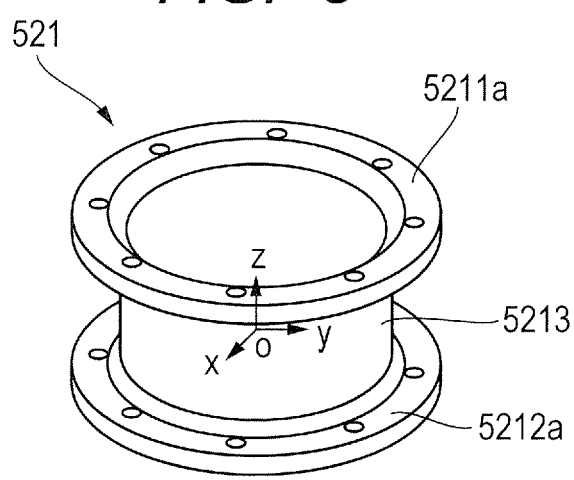
FIG. 8 is a perspective view showing an exemplary shape of an elastic body making up the torque sensor of FIG. 7.

As shown in FIG. 8, the elastic body 521 includes a flange 5211a serving as a first fixing portion and a flange 5212a serving as a second fixing portion. The flanges 5211a and 5212a are joined together by an elastically deformable portion 5213 cylindrical in shape, and are united into a cross-sectional shape such as shown in FIG. 9.

Figure 4:
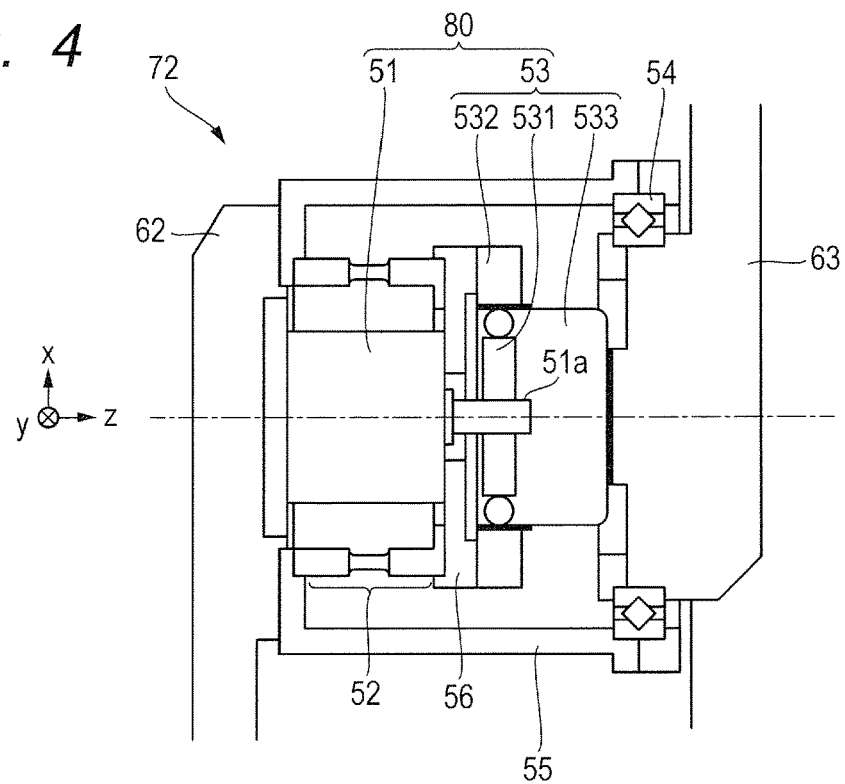
FIG. 4 is a schematic diagram showing a sectional structure of a joint driving apparatus according to a third embodiment of the present invention.
Figure 9:
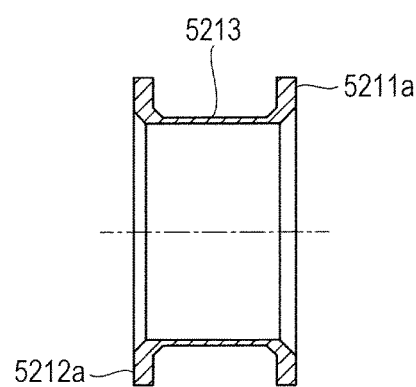
FIG. 9 is a sectional view showing an exemplary shape of an elastic body making up the torque sensor of FIG. 7.

The torque detection apparatus 52 configured as illustrated in FIGS. 7 to 9 is incorporated into the joint driving apparatus (72) as shown in FIG. 4. That is, the flange 5211a of the torque detection apparatus 52 is fixed to the holding member 56 of the driving unit 80 and the flange 5212a is fixed to the inner surface of the housing unit on the side of the first link 62. A torque sensor (52s: not shown) made up of an optical sensor, magnetic sensor, or the like is placed, for example, at an appropriate location on an inner surface (or outer surface) of the elastically deformable portion 5213 so as to be able to detect torsion of the elastically deformable portion 5213 or relative displacement of the flanges 5211a and 5212a.

As described above, the torque detection apparatus 52 is made up of the cylindrical elastic body 521, fixed at one end to the holding member 56 of the driving unit 80 as with the first embodiment, and fixed at the other end to the inner surface of the housing unit 55 on the side of the first link 62. The rest of the configuration of the joint driving apparatus (72) is similar to the first embodiment (FIG. 2).

The present embodiment can measure torque (rotational moment around Z axis shown in FIG. 2) by measuring a torsional deformation amount (or distortion amount) of the cylindrical elastic body 521 (elastically deformable portion 5213). Consequently, as with the first embodiment, joint driving torque can be detected accurately without being affected by cross-axis interference (crosstalk). In particular, according to the present embodiment, the cylindrical elastic body 521 (elastically deformable portion 5213) of the torque detection apparatus 52 is fixed at one end to the base (on the side of the link 62) of the housing unit 55 which is hardly deformed by cross-axis forces. This allows joint driving torque to be detected accurately without being affected by cross-axis interference (crosstalk).

Also, the present embodiment can simplify the structure of the torque detection apparatus 52, reduce the size and weight of the torque detection apparatus 52, and reduce the production cost of the torque detection apparatus 52. In particular, by configuring the elastic body 521 (elastically deformable portion 5213) of the torque detection apparatus 52 into a cylindrical shape, the torque detection apparatus 52 can be mounted using space around the rotary drive source 51 of the driving unit 80 in the joint driving apparatus (72). Also, the elastic body 521 of the torque detection apparatus 52 can be configured to have a relatively large size and it is likely that an inexpensive torque sensor with a not very high resolution can be used to detect the deformation of the elastic body 521.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050123, filed Mar. 13, 2015, which is hereby incorporated by reference herein in its entirety.

What is claimed is:

1. A joint driving apparatus comprising:
a housing unit fixed to a first link;
a driving unit housed in the housing unit and adapted to rotationally drive a second link, an output shaft of the driving unit being connected to the second link;
a bearing fixed to the housing unit, the bearing (i) adapted to rotatably support the second link and (ii) configured to couple the second link to the housing unit; and
a supporting unit configured to couple the driving unit to the housing unit and configured to support the driving unit on the housing unit, the supporting unit including (i) an elastic body configured to deform according to a relative movement of the driving unit in relation to the housing unit in a rotating direction of the second link and (ii) a sensor configured to measure a torque based on the deformation of the elastic body.

2. The joint driving apparatus according to claim 1, wherein the elastic body is configured to be annular in shape and adapted to support the driving unit.

3. The joint driving apparatus according to claim 1, wherein an inner circumference side of the elastic body is fixed to the driving unit, and
wherein an outer circumference side of the elastic body is fixed to a flange portion of the housing unit.

4. The joint driving apparatus according to claim 3, wherein the outer circumference side of the elastic body is fixed at position on of the housing unit which is close to the bearing adapted to support the second link.

5. The joint driving apparatus according to claim 1, wherein the elastic body is configured to be cylindrical in shape and adapted to support the driving unit.

6. The joint driving apparatus according to claim 5, wherein the cylindrical elastic body is fixed at one end to the driving unit and fixed at another end to an inner surface of the housing unit on a side of the first link.

7. The joint driving apparatus according to claim 1, wherein the sensor is a sensor device adapted to detect a deformation amount of the elastic body.

8. The joint driving apparatus according to claim 1, wherein the driving unit includes a rotary drive source and a reduction mechanism, the reduction mechanism being adapted to decelerate rotation of the rotary drive source.

9. The joint driving apparatus according to claim 8, wherein the supporting unit has a holding member holding the rotary drive source and a fixing portion supporting the reduction mechanism, the housing unit is fixed to an outer circumference side of the elastic body via a flange portion of the housing unit, the rotary drive source is fixed to an inner circumference side of the elastic body via the holding member, and the reduction mechanism is fixed to the inner circumference side of the elastic body via the fixing portion.

10. A robot apparatus comprising the joint driving apparatus according to claim 1.

11. A method of manufacturing an article using the robot apparatus according to claim 10.

12. A robot apparatus comprising a plurality of joint driving apparatuses each driving one of a plurality of joints of a robot arm, wherein at least one of the plurality of joint driving apparatuses comprises:

a housing unit fixed to a first link;

a driving unit housed in the housing unit and adapted to rotationally drive a second link, an output shaft of the driving unit being connected to the second link;

a bearing fixed to the housing unit, the bearing (i) adapted to rotatably support the second link and (ii) configured to couple the second link to the housing unit; and a supporting unit configured to couple the driving unit to the housing unit and configured to support the driving unit on the housing unit, the supporting unit including (i) an elastic body configured to deform according to a relative movement of the driving unit in relation to the housing unit in a rotating direction of the second link and (ii) a sensor configured to measure a torque based on the deformation of the elastic body.

* * * * *